(12) United States Patent
Junkasem et al.

(10) Patent No.: US 10,961,385 B2
(45) Date of Patent: Mar. 30, 2021

(54) BIOPLASTIC COMPOSITION COMPRISING BIOMASS AS A COMPONENT AND A PRODUCTION PROCESS

(71) Applicant: PTT Public Company Limited, Bangkok (TH)

(72) Inventors: Jirawut Junkasem, Bangkok (TH); Narin Kaabbuathong, Bangkok (TH); Vivan Thammongkol, Bangkok (TH); Janjira Paiboolsuk, Bangkok (TH); Supattra Hemmood, Bangkok (TH)

(73) Assignee: PTT GLOBAL CHEMICAL PUBLIC COMPANY Limited, Bangkok (TH)

( * ) Notice: Subject to any disclaimer, the term of this patent is extended or adjusted under 35 U.S.C. 154(b) by 149 days.

(21) Appl. No.: 16/311,099

(22) PCT Filed: May 31, 2017

(86) PCT No.: PCT/TH2017/000044
§ 371 (c)(1),
(2) Date: Dec. 18, 2018

(87) PCT Pub. No.: WO2018/021980
PCT Pub. Date: Feb. 1, 2018

(65) Prior Publication Data
US 2020/0308395 A1    Oct. 1, 2020

(30) Foreign Application Priority Data

Jul. 28, 2016    (TH) .................................. 1601004340

(51) Int. Cl.
| | |
|---|---|
| *C08L 67/02* | (2006.01) |
| *C08J 3/22* | (2006.01) |
| *C08K 5/02* | (2006.01) |
| *C08K 9/00* | (2006.01) |
| *C08K 11/00* | (2006.01) |
| *C08L 67/04* | (2006.01) |

(52) U.S. Cl.
CPC ................. *C08L 67/02* (2013.01); *C08J 3/22* (2013.01); *C08K 5/02* (2013.01); *C08K 9/00* (2013.01); *C08K 11/005* (2013.01); *C08L 67/04* (2013.01); *C08K 2201/018* (2013.01)

(58) Field of Classification Search
USPC ........................................................ 525/165
See application file for complete search history.

(56) References Cited

FOREIGN PATENT DOCUMENTS

| EP | 2644643 A1 | 10/2013 |
| KR | 20110138495 A | 12/2011 |
| WO | 2010009355 A2 | 1/2010 |

OTHER PUBLICATIONS

Lalita Jompang et al: "Poly(Lactic Acid) and Poly(Butylene Succinate) Blend Fibers Prepared by Melt Spinning Technique", Energy Procedia, vol. 34, Jan. 1, 2013 (Jan. 1, 2013), pp. 493-499, XP055436078, NL ISSN: 1876-6102, DOI: 10.1016/j.egypro.2013.06.777.

Y. Deng et al: "Blending poly(butylene succinate) with poly(lactic acid): Ductility and phase inversion effects", European Polymer Journal, vol. 71, Oct. 1, 2015 (Oct. 1, 2015), pp. 534-546, XP055436713, GB ISSN: 0014-3057, DOI: 10.1016/j.eurpolymj.2015.08.029.

*Primary Examiner* — Terressa Boykin
(74) *Attorney, Agent, or Firm* — Troutman Pepper Hamilton Sanders LLP

(57) ABSTRACT

This invention discloses a bioplastic composition comprising biomass as a component comprising a plastic compound resin comprising polybutylene succinate (PBS), polylactic acid (PLA), and additives selected from biomass from the coffee roasting processes, i.e. silver skin of coffee (SSC); and/or at least one fluoropolymer or fluoropolymer derivative as a friction reducing agent. This invention also relates to a process of pretreating the silver skin coffee for using as an additive for bioplastic resin to produce various products or using as a natural color masterbatch together with other plastics via extrusion, injection molding, compression and thermoforming processes in the industrial level.

21 Claims, No Drawings

BIOPLASTIC COMPOSITION COMPRISING BIOMASS AS A COMPONENT AND A PRODUCTION PROCESS

TECHNICAL FIELD OF THE INVENTION

The invention is in a chemical and polymer fields. This invention relates to a bioplastic composition comprising biomass as a component and a production process of said bioplastic composition.

BACKGROUND OF THE INVENTION

From an estimation of global bioplastic consumption, it reveals that there is a rapid increase from 1,492,000 tons in 2012 to 6,731,000 tons in 2018 [Source: European Bioplastics Association (2013), BIOPLASTICS facts and figures. http://www.corbion.com/media/203221/eubp_factsfigures_bioplastics_2013.pdf]

Research and development of bioplastic composition using biomass as a component to reduce costs and improve the properties of bioplastic composition have been cited in several patent documents. They reveal about the bioplastic compositions and applications, and also the preparation process of bioplastic including various steps to obtain desired products. For example, First example, US Publication No. 2007/0287795A1 entitled "Composite materials from corncob granules and process for preparation" discloses a biodegradable plastic composition comprising 70-80 wt % of polylactic acid (PLA), 20-30 wt % of corncob; and also a physical and chemical modification process of corncob by various methods such as high-frequency ultrasound and ozone (UV-ozone treatment), ammonia fiber explosion (AFEX) to provide corncob having properties that are suitable for the polymer.

Second example, U.S. Pat. No. 9,314,945 B2 entitled "Method for producing artificial stone using used ground coffee" discloses a use of a mixture of 10-40 wt % of ground coffee, 40-89 wt % of resin selected from polyester or polyurethane or acrylic, 0.5-5 wt % of peroxide catalysts, 0.5-4 wt % of metal salt catalysts, an additive selected from 0.01-40 wt % of calcium carbonate or 0.01-45% of aluminum trihydrate, and 0.0 1-4 wt % of color. Also, it discloses a method for producing artificial stone using said mixture.

Third example, Korean Patent No. KR101344471B1 entitled "Bio plastic using coffee residual products and method making the same" discloses a bioplastic composition comprising 47-65 wt % of polyethylene (PE), 10-20 wt % of byproduct of coffee, 5-20 wt % of at least one inorganic substance selected from calcium carbonate ($CaCO_3$) or talcum or silica or mica, 2-5 wt % of titanium dioxide, 1-3 wt % of at least one dispersing agents selected from calcium stearin or zinc stearin or magnesium, and 1-5 wt % of at least one of plastic flow enhancer selected from EBS wax or p-wax.

From the above disclosed patent documents, it is clearly seen that an international research trend is to develop plastic compositions using biomass as a component to reduce costs and/or to improve specific bioplastic characteristics; to differentiate bioplastic products; and also to mitigate environmental problems using residual biomass to generate good benefits.

SUMMARY OF THE INVENTION

This invention relates to a development of a bioplastic composition comprising biomass as a component, the bioplastic composition comprising (i) a plastic compound resin comprising (a) 50-85 wt % of polybutylene succinate (PBS) based on the total plastic compound resin weight, (b) 10-50 wt % of polylactic acid (PLA) based on the total plastic compound resin weight; and (ii) an additive selected from/or comprising (a) 1-80 parts per hundred plastic compound resin (phr) of biomass from coffee roasting process, i.e. silver skin of coffee (SCC), and/or (b) 0.1-5 parts per hundred plastic compound resin (phr) of at least one fluoropolymer or fluoropolymer derivative as a friction reducing agent.

In addition, this invention relates to a pretreatment process of silver skin of coffee (SCC) which is biomass from the coffee roasting process, for using as an additive for bioplastic composition to produce bioplastic products with cost reduction, remarkable properties (i.e. biodegradable, having contact texture like natural materials, and mechanical properties including polymer flow high enough to apply. The coffee roasting process with production capacity of 1,800 tons a year provides residual SSC biomass up to 8.8 tons per year.

An objective of this invention is to provide a bioplastic composition comprising biomass as a component and a process for preparing the bioplastic composition used for producing biodegradable plastics at reduced cost in order to produce a variety of products. The final bioplastic products would look and feel like a natural material. This composition can be used as a color masterbatch together with other bioplastics such as polylactic acid (PLA), polybutylene succinate (PBS), polybutylene succinate-co-adipate (PBSA), and polybutylene adipate-co-terephthalate (PBAT), etc.; and/or to use as a natural color masterbatch together with other conventional plastics such as polyolefins, polystyrene, polyamide, acrylonitrile-co-butadiene-co-styrene in a ratio of 5-99 parts per hundred mixed plastic resin (phr) via extrusion, injection, compression and thermoforming processes in the industrial level.

DETAILED DESCRIPTION OF THE INVENTION

This invention relates to a development of a bioplastic composition comprising biomass as a component and a production process including a pretreatment process of silver skin of coffee which is biomass from a coffee roasting process, for using as an additive for bioplastics.

The bioplastic composition comprising biomass as the component according to this invention comprising:
(i) a plastic compound resin comprising
  (a) 50-85 wt % of polybutylene succinate based on the total plastic compound resin weight;
  (b) 10-50 wt % of polylactic acid based on the total plastic compound resin weight; and
(ii) an additive selected from or comprising
  (a) 1-80 parts per hundred plastic compound resin (phr) of biomass from coffee roasting process, i.e. silver skin of coffee, and/or
  (b) 0.1-5 parts per hundred plastic compound resin (phr) of at least one fluoropolymer or fluoropolymer derivative as a friction reducing agent, According to an embodiment of this invention, the content of polybutylene succinate is preferably 50-85 wt % based on the total plastic compound resin weight, more preferably 80-85 wt % based on the total plastic compound resin weight. The said polybutylene succinate results in a suitable flow index of the bioplastic composition for the injection molding process.

According to an embodiment of this invention, the content of polylactic acid is preferably 10-50 wt % based on the total plastic compound resin weight, more preferably 10-20 wt % based on the total plastic compound resin weight. The said polylactic acid provides the products with improved strength.

According to an embodiment of this invention, the additive may comprise 1-80 parts per hundred plastic compound resin (phr) of the biomass from coffee roasting process, i.e. the silver skin of coffee, more preferably 5-70 parts per hundred plastic compound resin (phr) of the pretreated silver skin of coffee. The said contents provide the final molded bioplastic products with contact texture like natural materials, also reduced the cost of bioplastic products.

According to an embodiment of this invention, the additive may be selected from 0.1-5 parts per hundred plastic compound resin (phr) of at least one fluoropolymer or fluoropolymer derivative as a friction reducing agent. This friction reducing agent provides better flow of bioplastic composition, and suitable for producing plastic products.

According to an embodiment of this invention, the bioplastic composition according to this invention is suitable for plastic injection molding process providing the final bioplastic product with contact texture like natural materials, for example, home furnishings and accessories.

The process for producing the bioplastic composition comprising biomass composition from the coffee roasting process according to this invention comprises three main steps which are:

1. a pretreatment process of the silver skin of coffee according to this invention for using as an additive for bioplastic resin, the pretreatment process comprises two main steps which are:
   (i) washing the silver skin of coffee; and
   (ii) removing moisture from the washed silver skin of coffee from the step (i);

2. a preparation of plastic composition comprising the steps of:
   (i) mixing polybutylene succinate (PBS) and polylactic acid (PLA);
   (ii) compounding the plastic compound obtained from the step 2(i) with the additive;
   (iii) cutting and storing the plastic compound obtained from the step 2(ii); and
   (iv) removing moisture from the plastic compound resin obtained from the step 2(iii)

3. an injection molding of the plastic compound resin obtained from the step 2(iv) comprising the steps of:
   (i) feeding the plastic compound resin obtained from the step 2(iv) into the injection molding machine; and
   (ii) injection molding to obtain plastic products with contact texture like natural materials.

According to an embodiment of this invention, the preferred pretreatment process of the silver skin of coffee comprises steps of washing the silver skin of coffee using water as a solvent at 60-90° C., with a weight ratio of water to silver skin of coffee in a range of 60:1 to 1000:1, most preferably the weight ratio of water to silver skin of coffee in a range of 100:1 to 200:1. This step provides easier plastic mixing in the injection molding process leading to better continuous injection process and also color stain reduction on the mold from the silver skin of coffee.

According to an embodiment of this invention, the preferred pretreatment process of the silver skin of coffee comprises the step for removing moisture from the silver skin of coffee obtained from the step 1(i). The step is conducted at 60-80° C. for at least 4 hours, preferably 8-12 hours. The moisture removal from the silver skin of coffee obtained from the step 1(i) provides a decrease in the moisture of the silver skin of the coffee from 70-80% to only 2-10%, and effectively mixed with the plastic compositions—generating no air bubbles in the plastic resins during the compounding step, and prolonged storage period of the silver skin of coffee obtained from the step 1(i). Moreover, the moisture removal from the silver skin of coffee in the step 1(ii) may be conducted under vacuum condition to shorten the time and/or lower the moisture removal temperature of the silver skin of coffee.

According to an embodiment of this invention, the polybutylene succinate (PBS) and the polylactic acid (PLA) are preferably compounded with additives using proper mixers. This provides uniform dispersion of plastic compound prior to the next step.

According to an embodiment of this invention, the compounding the plastic compound obtained from the step 2(i) with the additive is preferably conducted using a twin screw extruder by feeding the plastic compound via the main feeder and feeding the additive via the side feeder provides good results. Applying this separated feeding process makes it possible to control the additive content in the plastic compound to be more accurate.

According to an embodiment of this invention, the moisture removal from the plastic compound resin obtained from the step 2(iii) carried out at a temperature of 60-80° C. for at least 4 hours is preferred. This moisture removal step results in a remained moisture content of only 2-5% providing a decrease in undesired side reactions such as hydrolysis. This also controls quality of the plastic compound resin in each preparation, and prolonged storage time. Besides, this moisture removal may perform under vacuum condition to reduce time or temperature in the moisture removal from the plastic compound resin.

According to an embodiment of this invention, the preferred step of compounding the plastic compound obtained from the step 2(i) with the additives using the twin screw extruder is conducted at 150-210° C. of twin screw extruder temperature and 100-400 rpm of screw speed. Under this processing condition set forth above, the plastic compound resin completely melt, and reduce any undesired side reactions such as hydrolysis, thermal degradation, etc.

According to an embodiment of this invention, the step of feeding the plastic compound resin obtained from the step 2(iv) into the injection molding machine with condition as follows: 150-250° C. of injection molding temperature, 10-100 cm$^3$/s of injection speed, 1000-2200 bars of injection pressure, 20-50° C. of mold temperature, and 2-10 seconds of cooling time. This processing condition as defined above results in continuous production; and the bioplastic production period close to the commercial one where the obtained bioplastic products possess good qualities, contact texture like natural materials, and lower number of defect products.

According to an embodiment of this invention, the preferred process is an injection molding process to obtain bioplastic products with contact texture like natural materials.

EXAMPLE

Example: A preparation of plastic compound resin having biomass composition from the coffee roasting process for injection molding process to obtain the bioplastic product with contact texture like natural materials. The formula shown in Table 1 is as follows.

1. Washing the silver skin of coffee using water as a solvent at 60-90° C.,
2. Removing moisture from all compositions including the washed silver skin of coffee at a temperature of 60-80° C. for at least 4 hours,
3. Weighing all compositions as desired, by mixing the plastic compositions using dry mixing, then feeding all compositions in the twin screw extruder by separated feeding, i.e. feeding the plastic compound in the main feeder and feeding the additives in the side feeder,
4. Setting up the twin screw extruder condition as determined, i.e. 180-200° C. of twin screw extruder temperatures, 100-300 rpm of screw speed, and 1-5 kg/hour of plastic compound feeding rate; then cooling the plastic compound resin by passing through water; and putting into the plastic cutting machine,
5. Placing the plastic compound resin in the oven to remove moisture using a temperature of 60-80° C. for at least 4 hours, determining a melt flow rate (MFR) of the compound with a melt flow meter,
6. Preparing the test specimens from the plastic compound resin according to the ASTM using the injection molding machine with this condition: 150-250° C. of injection molding temperature, 10-100 $cm^3$/s of injection speed, 1000-2200 bar of injection pressure, 20-50° C. of mold temperature and 2-10 seconds of cooling time,
7. Placing the obtained test specimens in a controlled temperature and humidity chamber stored at 21-25° C. and 45-55% relative humidity for at least 40 hours,
8. Conducting the property tests such as mechanical properties, melt flow index of polymer, color values, etc. of the test specimens. The test results are shown in Table 2. Table 1 shows the plastic compound composition and the percentages of the reduced cost as added the silver skin of coffee (SSC).

| Sample | Polybutylene succinate (PBS) (wt %) | Polylactic acid (PLA) (wt %) | Non-pretreated SSC (phr) | Pretreated SSC (phr) | Friction reducing agent (phr) | % reduced cost as added SSC |
|---|---|---|---|---|---|---|
| A | 80 | 20 | — | — | — | 0 |
| B | 80 | 20 | 4.2 | — | 0.1 | 2.6 |
| C | 80 | 20 | 8.7 | — | 0.3 | 4.6 |
| D | 80 | 20 | 19.0 | — | 0.6 | 9.8 |
| E | 80 | 20 | 31.6 | — | 0.9 | 14.4 |
| F | 80 | 20 | 47.1 | — | 1.4 | 19.6 |
| G | 80 | 20 | 66.7 | — | 2.0 | 24.2 |
| H | 80 | 20 | — | 4.2 | 0.1 | 1.9 |
| I | 80 | 20 | — | 8.7 | 0.3 | 3.9 |
| J | 80 | 20 | — | 19.0 | 0.6 | 8.5 |
| K | 80 | 20 | — | 31.6 | 0.9 | 12.4 |
| L | 80 | 20 | — | 47.1 | 1.4 | 16.9 |
| M | 80 | 20 | — | 66.7 | 2.0 | 20.9 |

Table 2 Shows the Properties of Various Plastic Compositions

| Sample | Process-ability | Melt flow rate: MFR (g/10 min) | Flexural Modulus (MPa) | Flexural strength (MPa) | Color measurement L* | a* | b* |
|---|---|---|---|---|---|---|---|
| A | good | 23.82 ± 0.25 | 1,144 ± 53 | 48.3 ± 1.3 | 80.62 ± 0.35 | −1.53 ± 0.03 | −1.36 ± 0.16 |
| B | good | 25.30 ± 0.50 | 1,194 ± 18 | 48.0 ± 0.5 | 39.60 ± 0.57 | 2.46 ± 0.05 | 6.07 ± 0.12 |
| C | good | 24.34 ± 0.77 | 1,291 ± 37 | 48.2 ± 0.4 | 34.37 ± 0.29 | 2.34 ± 0.21 | 5.25 ± 0.20 |
| D | good | 23.20 ± 0.79 | 1,468 ± 57 | 48.6 ± 0.5 | 28.44 ± 0.36 | 1.90 ± 0.06 | 3.74 ± 0.17 |
| E | fair | 22.49 ± 0.31 | 1,927 ± 43 | 47.6 ± 0.7 | 25.88 ± 0.20 | 1.58 ± 0.12 | 3.07 ± 0.04 |
| F | fair | 21.79 ± 1.45 | 2,190 ± 41 | 44.0 ± 0.9 | 24.80 ± 0.36 | 1.41 ± 0.03 | 2.59 ± 0.22 |
| G | fair | 9.31 ± 0.12 | 2,518 ± 67 | 34.3 ± 1.1 | 23.91 ± 0.17 | 1.34 ± 0.05 | 2.49 ± 0.05 |
| H | good | 23.54 ± 0.42 | 1,232 ± 21 | 48.2 ± 0.7 | 44.68 ± 0.83 | 2.69 ± 0.12 | 7.43 ± 0.17 |
| I | good | 21.76 ± 0.36 | 1,256 ± 36 | 48.8 ± 0.9 | 39.39 ± 0.61 | 2.52 ± 0.17 | 6.72 ± 0.14 |
| J | good | 20.31 ± 0.36 | 1,506 ± 30 | 50.0 ± 0.4 | 30.57 ± 0.31 | 2.12 ± 0.15 | 4.95 ± 0.15 |
| K | fair | 17.21 ± 0.36 | 1,758 ± 67 | 49.5 ± 0.8 | 28.73 ± 0.33 | 1.89 ± 0.20 | 4.37 ± 0.34 |
| L | fair | 12.87 ± 0.90 | 2,179 ± 40 | 44.0 ± 0.6 | 28.09 ± 0.76 | 1.43 ± 0.06 | 3.16 ± 0.16 |
| M | fair | 6.88 ± 0.59 | 2,452 ± 77 | 38.5 ± 2.0 | 32.06 ± 2.10 | 1.14 ± 0.09 | 4.09 ± 0.51 |

In general plastic injection work, the flow capacity is about 5-30 grams per 10 minutes period. From the results shown in Tables 1 and 2, it reveals that the bioplastic having the silver skin of coffee as a composition not more than 70 phr and flow ability in a range of 10-30 grams per 10 minutes period is suitable for plastic injection works. The bioplastic having the silver skin of coffee has similar flexural strength to the one without the silver skin of coffee. Considering the flexural modulus as shown in Table 2, it reveals that the flexural modulus increases as increasing the silver skin of coffee content in the bioplastic composition.

For the color measurement of the bioplastic having the silver skin of coffee as the composition, the CIELAB colorimetric system was applied. The CIELAB is a 3D colorimetric system where L* represents lightness. The CIELAB colorimetric system will have L* in a range of 0-100% where L* value=100% representing brightest white and L* value=0% representing darkest black; a* exhibits from +a* representing red color to −a* representing green color; b* displays from +b* representing yellow color to −b* representing blue color. From the results shown in Table 2, it reveals that the color value of the bioplastic having the silver skin of coffee has lower L*, i.e. the color value of the bioplastic having the silver skin of coffee has a continuously declined lightness value as increasing the silver skin of coffee content. Moreover, from the results shown in Table 1 and 2, it also shows that at the same silver skin of coffee content in the bioplastic, the pretreatment process of the silver skin of coffee affects the color value of the bioplastic having pretreated silver skin of coffee, i.e. greater L* value than the one having ordinary silver skin of coffee. This indicates that the color of the bioplastic having pretreated silver skin of coffee is lighter than the one having ordinary silver skin of coffee at the same silver skin of coffee content.

Incidentally, the results shown in Tables 1 and 2 reveal that the pretreatment process of the silver skin of coffee also helps to reduce the color stain of bioplastic having the silver skin of coffee on the mold.

Thus, this invention provides the bioplastic composition having biomass from the coffee roasting process, i.e. the silver skin of coffee; the pretreatment process of the silver skin of coffee used as an additive for bioplastics; and also the process for producing bioplastics, which can produce biodegradable products with lower production costs. Moreover, the bioplastic compositions according to this invention can be applied to general injection molding machines without any modification required. The obtained bioplastic products have outstanding properties, i.e. biodegradable, improved mechanical properties enough to further use, lower production costs, and contact texture like natural materials.

The use of bioplastics products as a natural color masterbatch together with other bioplastics such as polylactic acid (PLA), polybutylene succinate (PBS), polybutylene succinate-co-adipate (PBSA), and polybuthylene adipate-co-terephthalate (PBAT), etc.; and/or with other conventional plastics such as polyolefins, polystyrene, polyamide, acrylonitrile-co-butadiene-co-styrene at a ratio of 5-99 parts per hundred plastic compound resin (phr), preferably 10-40 parts per hundred plastic compound resin (phr).

This invention is not limited to only bioplastic composition comprising biomass from the coffee roasting process, i.e. the silver skin of coffee; the pretreatment process of the silver skin of coffee used as an additive for bioplastics; also the preparation process of the bioplastic as described above. This invention may have any alterations, changes, and modification, which is considered to be within the scope of this invention.

The bioplastic composition comprising biomass as a component and the preparation process of bioplastic composition for producing biodegradable plastics provides lower production cost. The biodegradable plastics is used for producing various products in which the final bioplastic products have contact texture like natural materials, or used as color master batch together with other bioplastics such as polylactic acid (PLA), polybutylene succinate (PBS), polybutylene succinate-co-adipate (PBSA), and polybuthylene adipate-co-terephthalate (PBAT), etc.; and/or used as natural color master batch together with other conventional plastics such as polyolefins, polystyrene, polyamide, acrylonitrile-co-butadiene-co-styrene at a ratio of 5-99 parts per hundred plastic compound resin (phr) via extrusion, injection, compression and thermoforming processes, preferably injection, in the industrial level.

BEST MODE OF THE INVENTION

Best mode of the invention is as disclosed in the detailed description of the invention.

What is claimed is:

1. A bioplastic composition comprising biomass as a component comprising
    a. a plastic compound resin comprising
        i. 50-85 wt % of polybutylene succinate based on the total plastic compound resin weight
        ii. 10-50 wt % of polylactic acid based on the total plastic compound resin weight
    b. an additive selected from or comprising
        i. 1-80 parts per hundred plastic compound resin (phr) of biomass from coffee roasting process which is silver skin of coffee, and/or
        ii. 0.1-5 parts per hundred plastic compound resin (phr) of at least one fluoropolymer or fluoropolymer derivative as a friction reducing agent.

2. The bioplastic composition comprising biomass as a component according to claim 1, wherein the polybutylene succinate content is 80-85 wt % based on the total plastic compound resin weight.

3. The bioplastic composition comprising biomass as a component according to claim 1, wherein the polylactic acid content is 10-20 wt % based on the total plastic compound resin weight.

4. The bioplastic composition comprising biomass as a component according to claim 1, wherein the silver skin of coffee is a pretreated silver skin of coffee.

5. The bioplastic composition comprising biomass as a component according to claim 4, wherein the content of the pretreated silver skin of coffee is 5-70 parts per hundred plastic compound resin (phr).

6. A process for producing the bioplastic composition comprising biomass as a component according to claim 1 comprising the steps of:
    a. pretreating the silver skin of coffee
    b. preparing the plastic compound resin
    c. injection molding the plastic compound resin with the additive.

7. The process for producing the bioplastic composition comprising biomass as a component according to claim 6, wherein the pretreatment process of the silver skin of coffee comprising the steps of:
    a. washing the silver skin of coffee
    b. removing moisture from the washed silver skin of coffee.

8. The process for producing the bioplastic composition comprising biomass as a component according to claim 7, wherein washing the silver skin of coffee is conducted using water as a solvent at 60-90° C., with a weight ratio of water to silver skin of coffee in a range of 60:1 to 1000:1.

9. The process for producing the bioplastic composition comprising biomass as a component according to claim 8, wherein washing the silver skin of coffee is conducted with the weight ratio of water to silver skin of coffee is in a range of 100:1 to 200:1.

10. The process for producing the bioplastic composition comprising biomass as a component according to claim 7, wherein removing moisture from the washed silver skin of coffee is conducted at 60-80° C. for at least 4 hours, or moisture of the silver skin of coffee being 2-10%.

11. The process for producing the bioplastic composition comprising biomass as a component according to claim 7, wherein removing moisture from the washed silver skin of coffee is conducted at atmospheric pressure or vacuum condition.

12. The process for producing the bioplastic composition comprising biomass as a component according to claim 6, wherein the preparation of plastic composition comprising the steps of:
   a. compounding the plastic composition with the additive,
   b. cutting and storing the plastic compound resin having additive,
   c. removing moisture from the plastic compound resin having additive.

13. The process for producing the bioplastic composition comprising biomass as a component according to claim 12, wherein removing moisture from the plastic compound resin having additive is conducted at 60-80° C. for at least 4 hours or moisture of the silver skin of coffee being 2-5%.

14. A method of utilizing the bioplastic composition comprising biomass as a component according to claim 1 as a natural color masterbatch together with other bioplastics and/or together with conventional plastics in a ratio of 5-99 parts per hundred plastic compound resin (phr).

15. The method according to claim 14, wherein the ratio of the natural color masterbatch together with other bioplastics and/or together with conventional plastics is 10-40 parts per hundred plastic compound resin (phr).

16. The method according to claim 14, wherein the other bioplastics are selected from polylactic acid, polybutylene succinate, polybutylene succinate-co-adipate or polybutylene adipate terephthalate.

17. The method according to claim 14, wherein the conventional plastic is selected from polyolefins, polystyrene, polyamide, acrylonitrile-co-butadiene-co-styrene.

18. A method of utilizing the bioplastic composition comprising biomass as a component according to claim 1 as a feeding material for an industrial plastic molding process selected from extrusion, injection, compression or thermoforming process.

19. The method according to claim 18, wherein the industrial plastic molding process is injection process.

20. The process for producing the bioplastic composition comprising biomass as a component according to claim 10, wherein removing moisture from the washed silver skin of coffee is conducted at 60-80° C. for 8-12 hours.

21. The process for producing the bioplastic composition comprising biomass as a component according to claim 12, wherein removing moisture from the washed silver skin of coffee is conducted at atmospheric pressure.

* * * * *

UNITED STATES PATENT AND TRADEMARK OFFICE
CERTIFICATE OF CORRECTION

PATENT NO. : 10,961,385 B2  
APPLICATION NO. : 16/311099  
DATED : March 30, 2021  
INVENTOR(S) : Jirawut Junkasem et al.

Page 1 of 1

It is certified that error appears in the above-identified patent and that said Letters Patent is hereby corrected as shown below:

On the Title Page

The Assignee listed at item (73) "PTT GLOBAL CHEMICAL PUBLIC COMPANY Limited" should read --PTT Public Company Limited--

Signed and Sealed this  
Thirty-first Day of August, 2021

Drew Hirshfeld  
*Performing the Functions and Duties of the*  
*Under Secretary of Commerce for Intellectual Property and*  
*Director of the United States Patent and Trademark Office*